United States Patent
Haring

[11] Patent Number: 6,152,043
[45] Date of Patent: Nov. 28, 2000

[54] PORTABLE TRACKED WHEEL

[76] Inventor: Joseph Edward Haring, 542 Farmingdale Rd., Huntsville, Ala. 35803

[21] Appl. No.: 09/348,738

[22] Filed: Jul. 6, 1999

[51] Int. Cl.[7] .................................................. B60M 1/34
[52] U.S. Cl. ........................................... 104/140; 104/242
[58] Field of Search .................. 104/140, 145, 104/242, 244.1, 139; 305/8

[56] References Cited

U.S. PATENT DOCUMENTS

| Re. 35,999 | 12/1998 | Gutknecht | 104/140 |
|---|---|---|---|
| 3,772,994 | 11/1973 | Juarbe | 104/140 |
| 3,859,925 | 1/1975 | Hartz | 104/140 |
| 4,129,203 | 12/1978 | Berman | 104/244.1 |
| 4,592,284 | 6/1986 | Fukuda | 104/140 |
| 5,303,655 | 4/1994 | Summa et al. | 104/140 |
| 5,597,217 | 1/1997 | Hoska et al. | 104/242 |
| 6,044,768 | 4/2000 | Czinki | 104/139 |

*Primary Examiner*—S. Joseph Morano
*Assistant Examiner*—Long Bao Nguyen
*Attorney, Agent, or Firm*—Mark Clodfelter

[57] ABSTRACT

A portable tracked wheel allows the operator or robot to move a vehicle from a surface track to another, or free the vehicle from guided motion without disassembly or modification of the wheel or track. By depressing the lock tab manually with hand or foot or remotely by mechanical or robotic means, the track retention mechanism can be positively engaged and the motion of the vehicle disposed to the track. Disengagement from the track is accomplished by depressing the lock tab in the same manner, allowing the retention mechanism to rotate out of the track, thereby freeing the motion of the vehicle. The anti-lift tracking mechanism is spring-loaded to maintain constant adhering force between the wheel and the tracked surface. Lateral translation of the wheel on the track is precluded by a slanted contact interface between the device and the track.

17 Claims, 12 Drawing Sheets

PORTABLE TRACKED WHEEL

STATEMENT

This invention was made without the use of any government support.

FIELD OF THE INVENTION

This invention relates to wheels, castors or the like which are mountable in secured engagement to a track, and particularly to a mounting arrangement wherein the wheels or castors are easily and conveniently removable or lockable from/to the track at any point thereon.

BACKGROUND OF THE INVENTION

The subject matter to which this invention pertains is in the field of kinematic and robotic mechanisms. Wheels, casters and rollers are used in a wide variety of applications to transport equipment and people between stations and locations. This utility of the wheel indeed relies on gravity or some other discrete force to hold the vehicle to the surface on which it travels. However, in certain modes of transportation, gravity is nullified or even negated by an equivalent or overcoming acceleration or force. An example of equivalence would be the case in space transport, where Earth's gravity is measured in micro-units. Overcoming or negating gravity can be achieved when enough lifting or tilting force is exerted on the vehicle to overcome its own weight, causing instability. Several examples of this are; 1) a commercial passenger aircraft refreshment cart lifting from the aisle floor during an extreme maneuver or sudden loss of elevation, 2) an ambulance gurney lifting from or sliding across the ambulance floor because of an unexpected maneuver, 3) a mobile tooling fixture braking or stopping suddenly and tipping over because of a high center-of-gravity, 4) the front wheels of a car lifting off the road because of the torque applied at the rear wheels.

Presently, structures that require frictionless anti-lift and anti-tilt ability rely on using a track with dual rollers. This type of design requires that the primary wheels placed on the track be equipped with additional internal track wheels that are connected through a slot opening in the track. The two wheels travel together, with the primary wheels supporting the weight of the vehicle and the secondary wheels running along the underside surface of the track preventing the primary wheel from lifting off the track if a load reversal occurs. Although this design is adequate for retaining the vehicle to the track, the vehicle cannot be removed from the track without disassembly of the entire wheel carriage assembly or movement of the vehicle to a designated end of the track. Present tracked wheel designs are therefore, not portable. The vehicle must remain on its original track until disassembled or removed at the end of the track. A tracked wheel that features an integral release mechanism allowing it to be portable, namely, moved from one track to another track or simply set free from the confines of the track, would be of particular use on vehicles subject to reversing or lifting forces.

Considering the issue of safety, the aircraft refreshment or food cart and ambulance gurney examples are used because these pose particular risks for passenger transportation. During flight, the cart is pushed along the aisle, fully susceptible to a sudden mishap that would cause it to lift off the floor. The cart may then become a massive projectile liable to cause considerable injury to passengers onboard or damage to the aircraft.

In the instance of an ambulance gurney, the gurney can lift from the vehicle floor and dislodge critical instrumentation or medicinal tubes attached to the patient. In accordance with this invention, a caster device that locks the cart or gurney to the floor while in service, but may be disengaged and returned to a safe stowage location after use, solves these problems. Moreover, movement of objects or vehicles in the weightless environment of extraterrestrial space, in certain cases, requires restraint to the primary spacecraft. An example of this is a mobile pallet or service vehicle used for maintenance or inspection of an external surface of an orbiting spacecraft. This invention, a portable tracked wheel, would assist the extravehicular activity by allowing the astronaut/operator to remove a stowed maintenance cart from one section of the spacecraft and attach it to the track to be rolled and utilized at a different area of the spacecraft. In addition, acceleration sleds, test apparatus and possibly aircraft landing gear may utilize this invention for its portability. Quick and easy removal, refurbishment and replacement of worn-out or damaged test fixtures that require stabilized mobility can be accomplished by means of this device. Launch and recovery of aircraft on unstable platforms can be accomplished with a robust and robotic configuration of this invention.

It is thus one object of the present invention is to fulfill the need for a portable tracked wheel assembly. This device will allow easy, portable removal and engagement between tracked vehicle motion and free motion outside of the track restraint. Accordingly, the operator or robot is afforded a simple push-tab to engage and disengage the anti-lift feature of the design. A wide variety of uses including safety, maintenance and assembly line processes can be greatly enhanced by this invention. Other objects will become clear upon a reading of the specification.

SUMMARY OF THE INVENTION

A wheel assembly for quickly and conveniently being engagable to or disengagable from any point along a track is disclosed. The wheel assembly, when engaged to the track, cannot be moved in any direction other than along the track. The wheel assembly is constructed having a frame, with an axle extending through the frame. At least one wheel is mounted to the axle, and a locking member for engaging the track is pivotally supported by the wheel assembly. The track is constructed having at least one flange generally parallel with a surface the wheel is adapted to ride on, with the locking member engagable to the flange at any point therealong by pivoting the locking member downward to engage the track and pivoting the locking member upward to disengage it from the track.

DETAILED DESCRIPTION OF THE INVENTION

Figure 1:
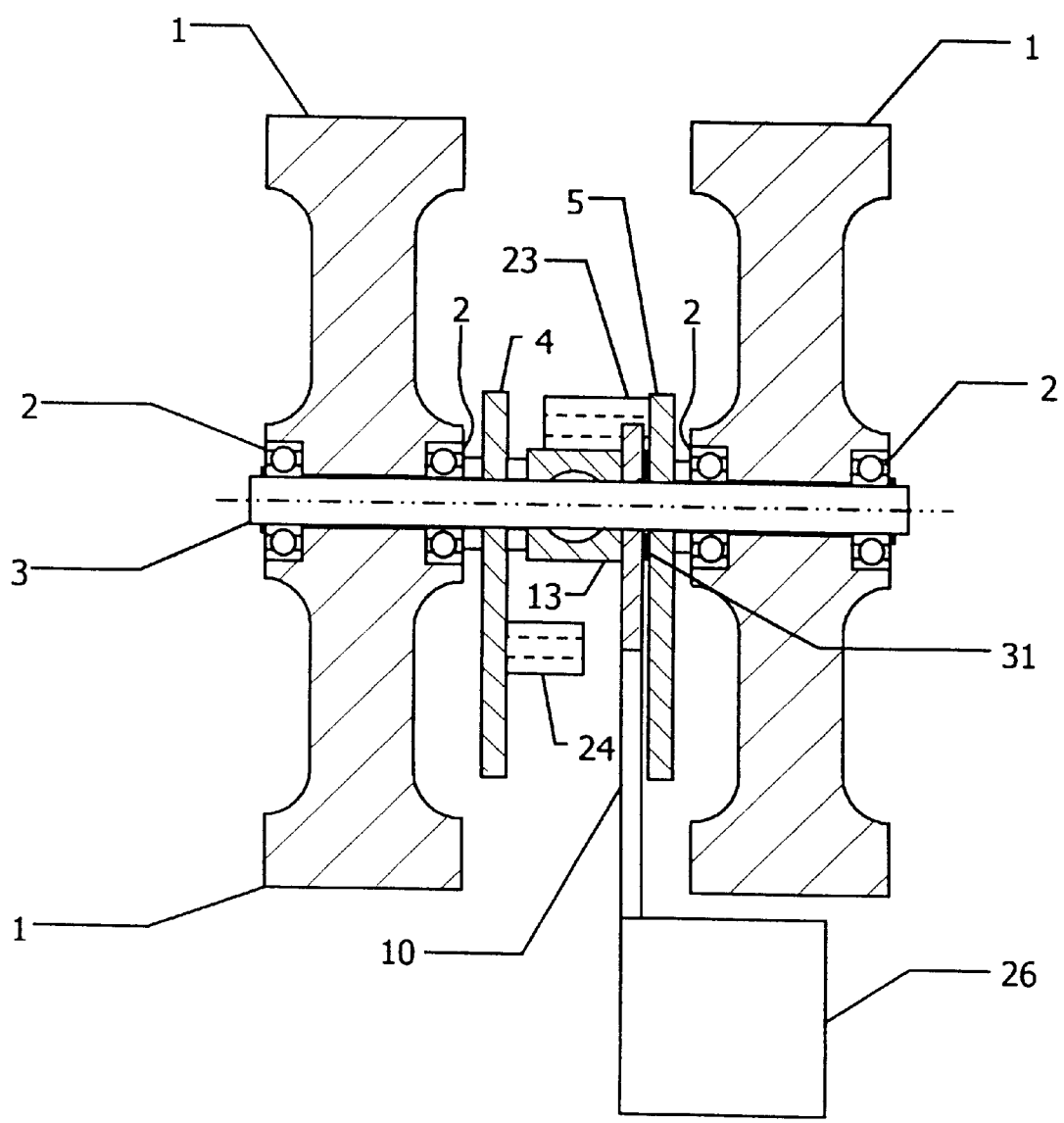
FIG. 1 is a top cross sectional view taken along lines 1—1 of FIG. 3 showing the caster assembly in the tracked position.

Referring to the drawings, a pair of casters, wheels or the like 1 are fitted on each of ends of axle 3 using ball-bearings 2 or similar antifriction means. In a configuration where casters 1 are restrained to a track 19, which may be imbedded in a groove in a floor 21 or other surface, typically in a vehicle, but which may be in a building such as a warehouse, or other open area such as an aircraft landing strip, stem rollers 18 inside track 19 contact an underside of a flange of the track 19. The amount of contact pressure between the underside of the flange and stem rollers 18 is determined by characteristics of a compression spring 14 housed in a cylinder 13. Stem shoe 17 retains a pair of generally opposed rollers 18, which are permitted to rotate on the shoe 17 by means of antifriction bearings, which may be constructed of a self-lubricating material, such as nylon, or by steel ball or roller bearings as shown. The stem rollers 18 and configuration of springs 14, 15 may vary in form and compression, allowing this invention to be used in light to heavy applications.

Figure 2:
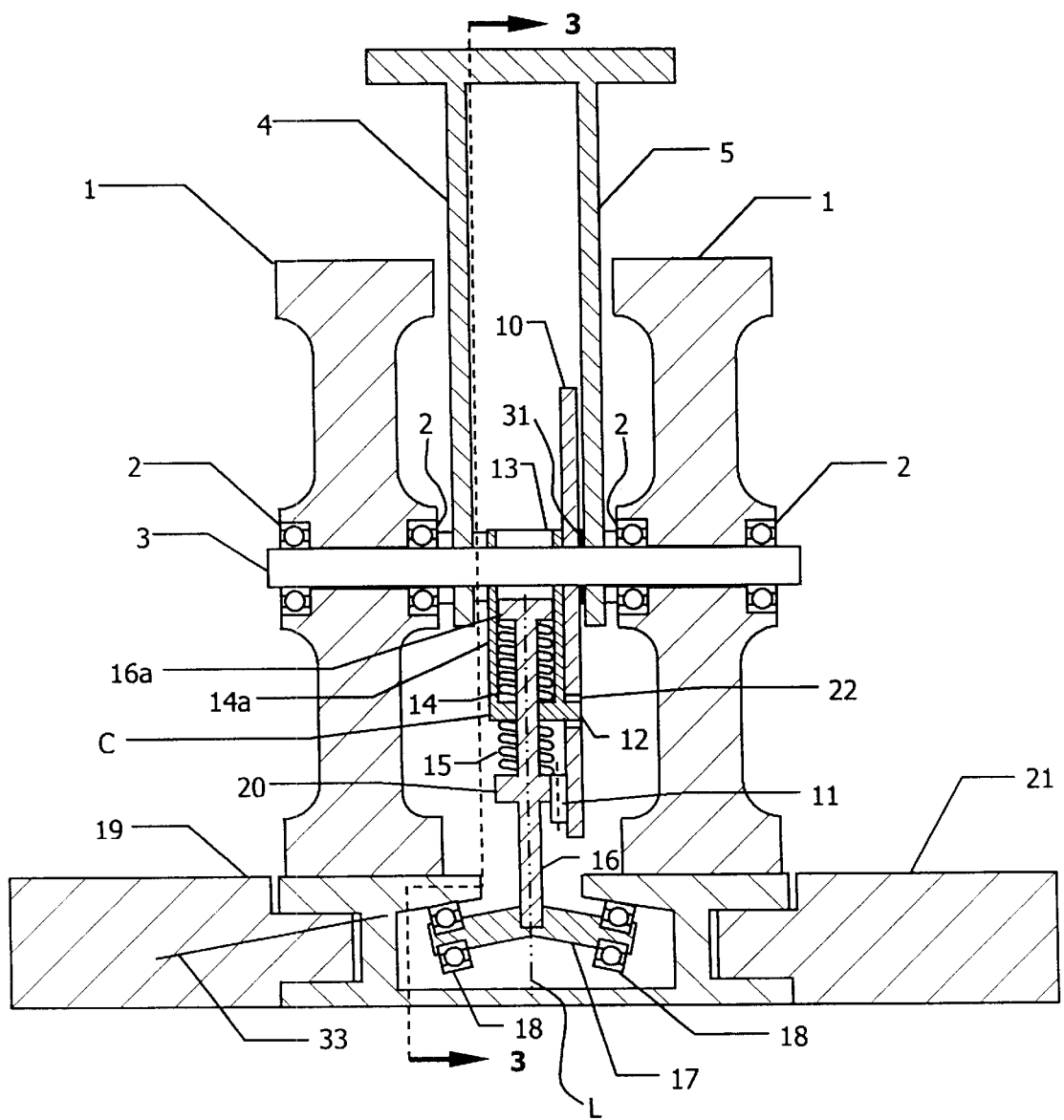
FIG. 2 is a rear cross sectional view taken along lines 2—2 of FIG. 3 showing the caster assembly in the tracked position.
Figure 3:
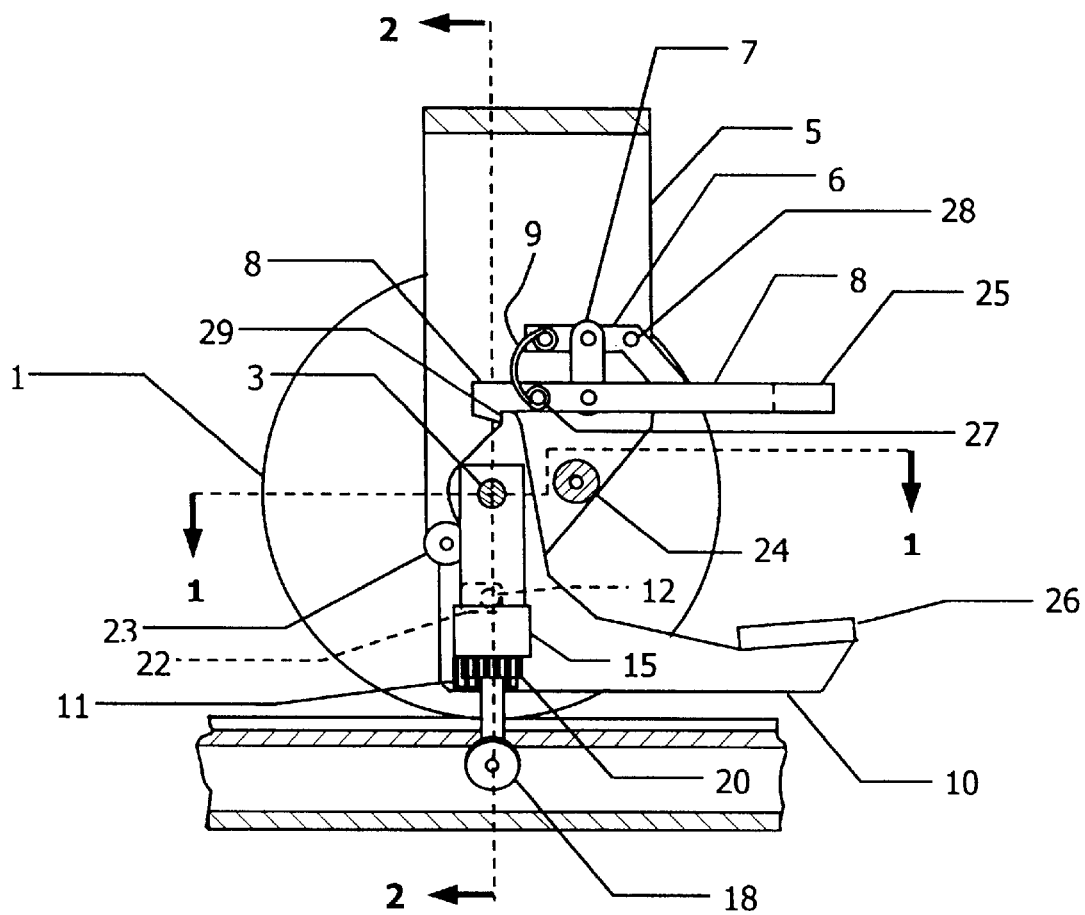
FIG. 3 cut-away view taken along lines 3—3 of FIG. 2 showing the invention in a locked-to-track position (manual actuation and locking).
Figure 4:
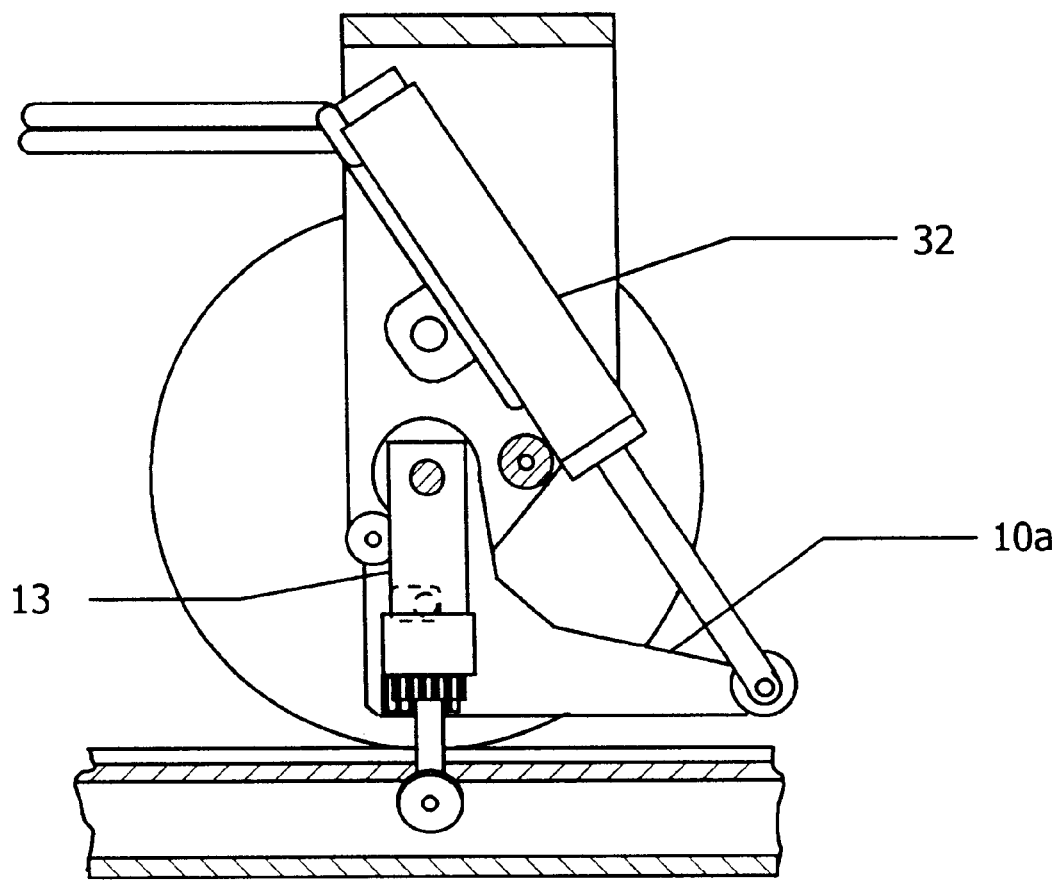
FIG. 4 is a cut-away view of the device in the locked-to-track position (robotic/remote actuation and locking)

The shoe assembly 17, 18 is mechanically attached to a stem 16 having an enlarged region 16a positioned in a cylinder 13 so that spring 14 bears between a closed end C of cylinder 13 and enlarged region 16a, biasing stem 16 upward while allowing the stem to rotate about a longitudinal axis L. The stem 16 features a pinion 20 that mates to a rack 11 on a swing plate 10 provided with a swing plate tab 26. A slotted opening 22 (FIGS. 3–9) is provided in the swing plate 10 and receives a pin 12 from cylinder 13, which pin being loosely fitted in a narrow dimension of slotted opening 22. This permits the swing plate 10 to rotate further about the axle 3 than the cylinder 13, thereby allowing the swing plate 10 to twist the stem 16 at a bottom dead center position by means of the rack 11 and pinion 20. The shoe 17 and underside of the track flange is slightly slanted as shown by angle 33 in FIG. 2, causing spring 14 to compress as the shoe 17 is rotated into the track 19. After shoe 17 is rotated to engage the underside of flange 19 as described, lateral motion of the wheels or castor 1 is prevented. A catch 29 on swing plate 10 engages a lock tab 25, locking swing plate 10, and thus cylinder 13, stem 16 and shoe 17, in the downward position. In the heavier applications as described, an additional spring 15 may be positioned between pinion 20 and closed end C of cylinder 13 to provide additional upward bias to stem 16.

Figure 5:
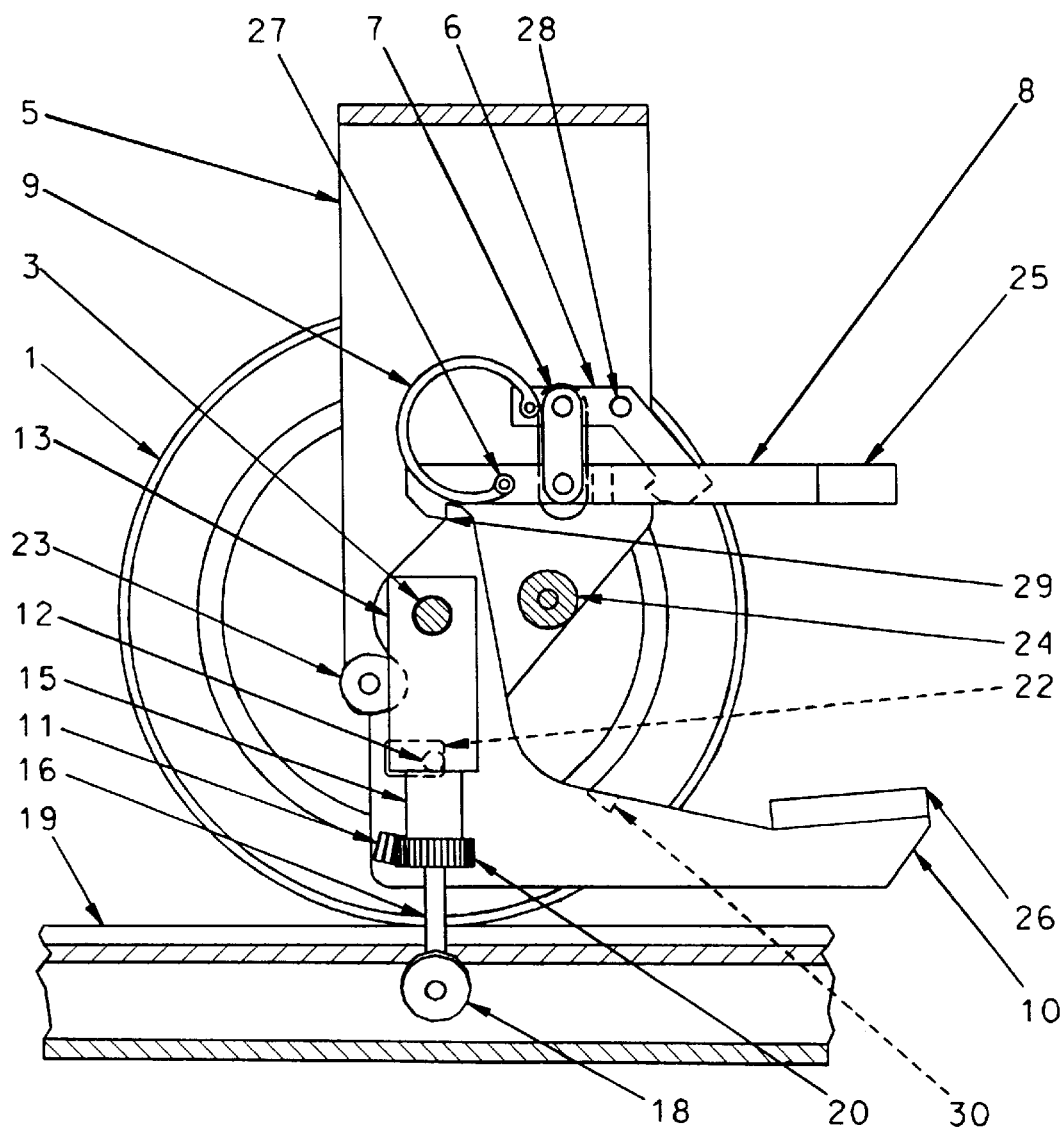
FIGS. 5–8 are cut away views showing stepwise progression between a locked-to-track position and an unlocked position of the invention.
Figure 6:
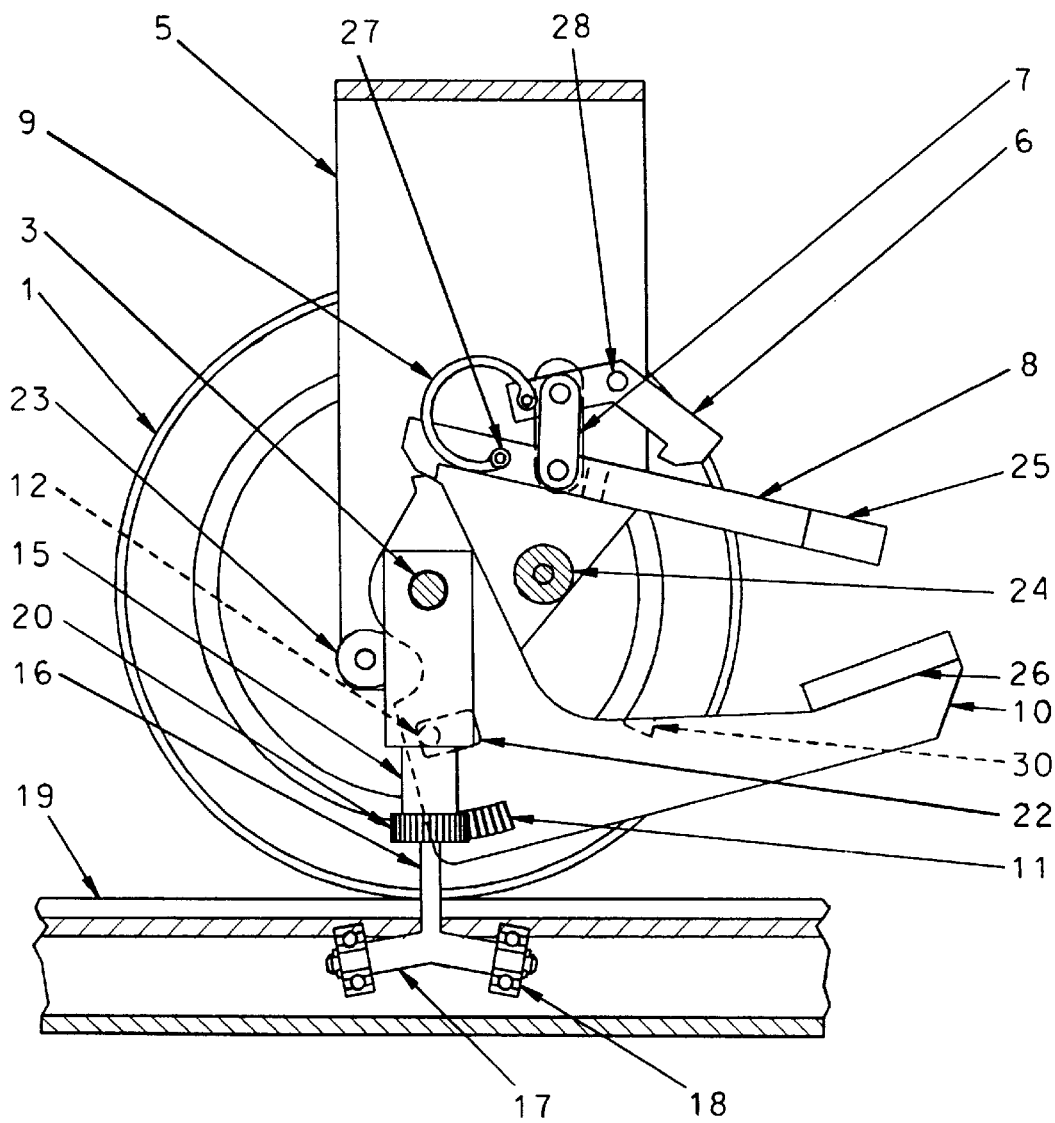
Figure 7:
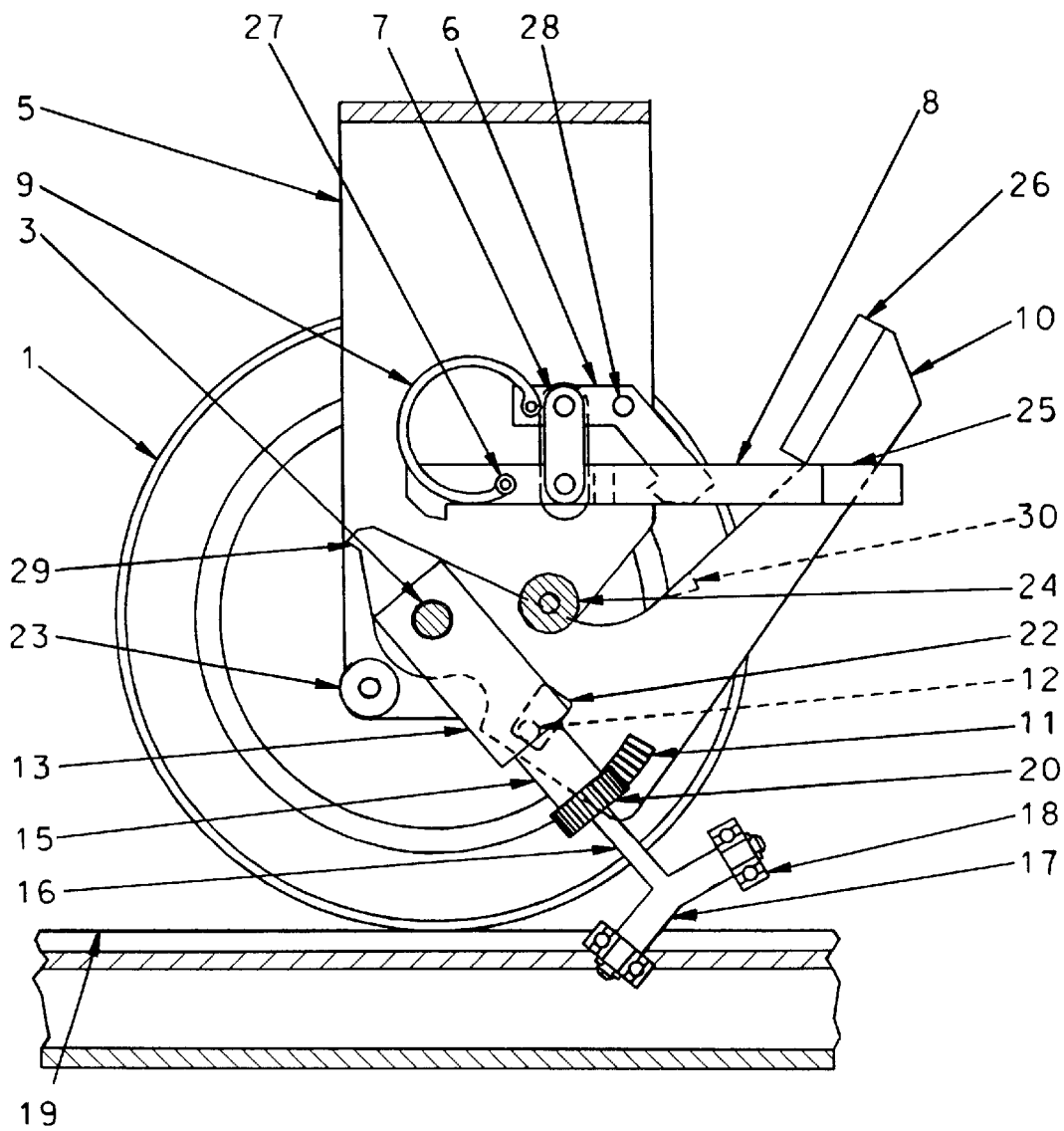
Figure 8:
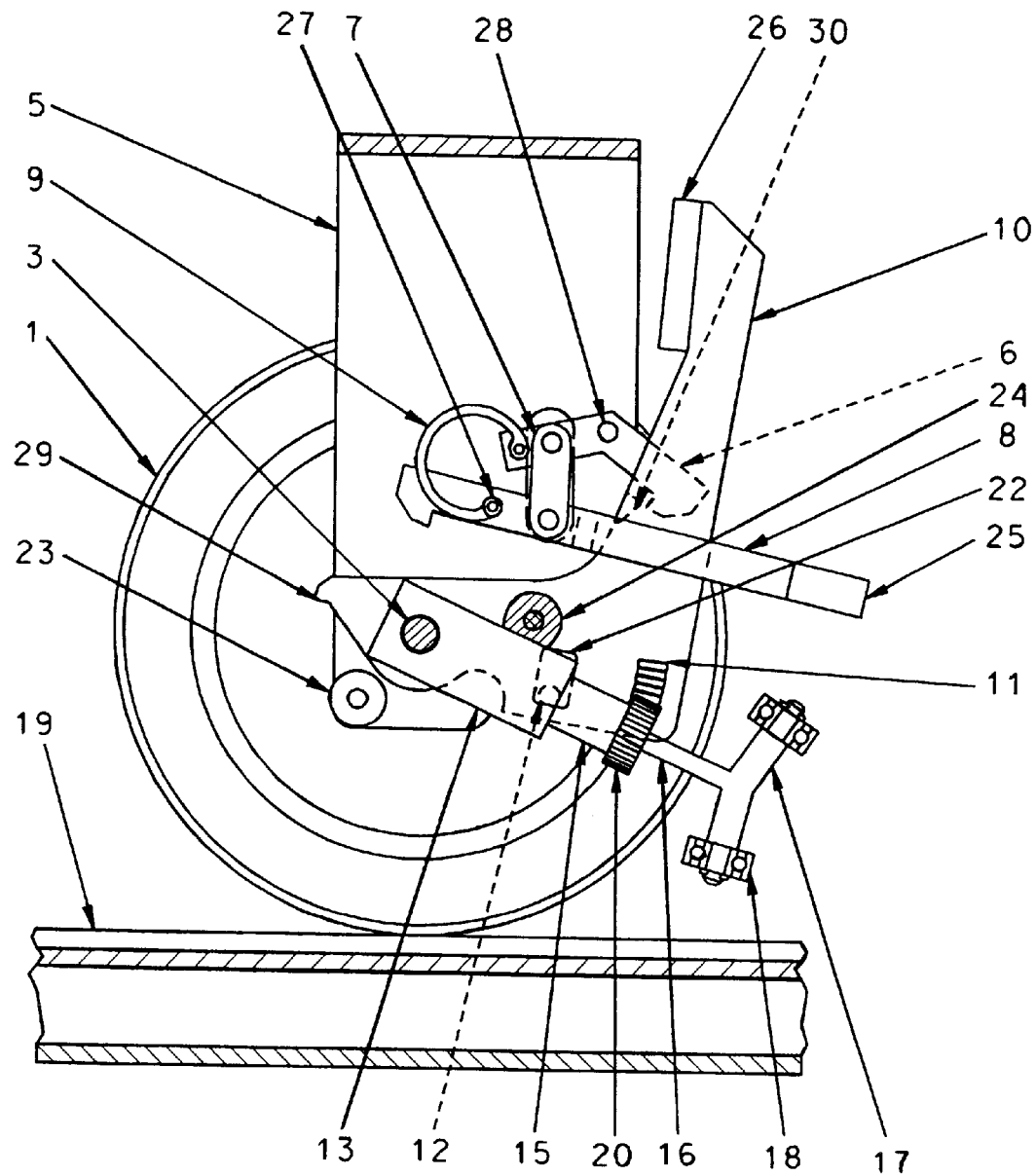
Figure 9:
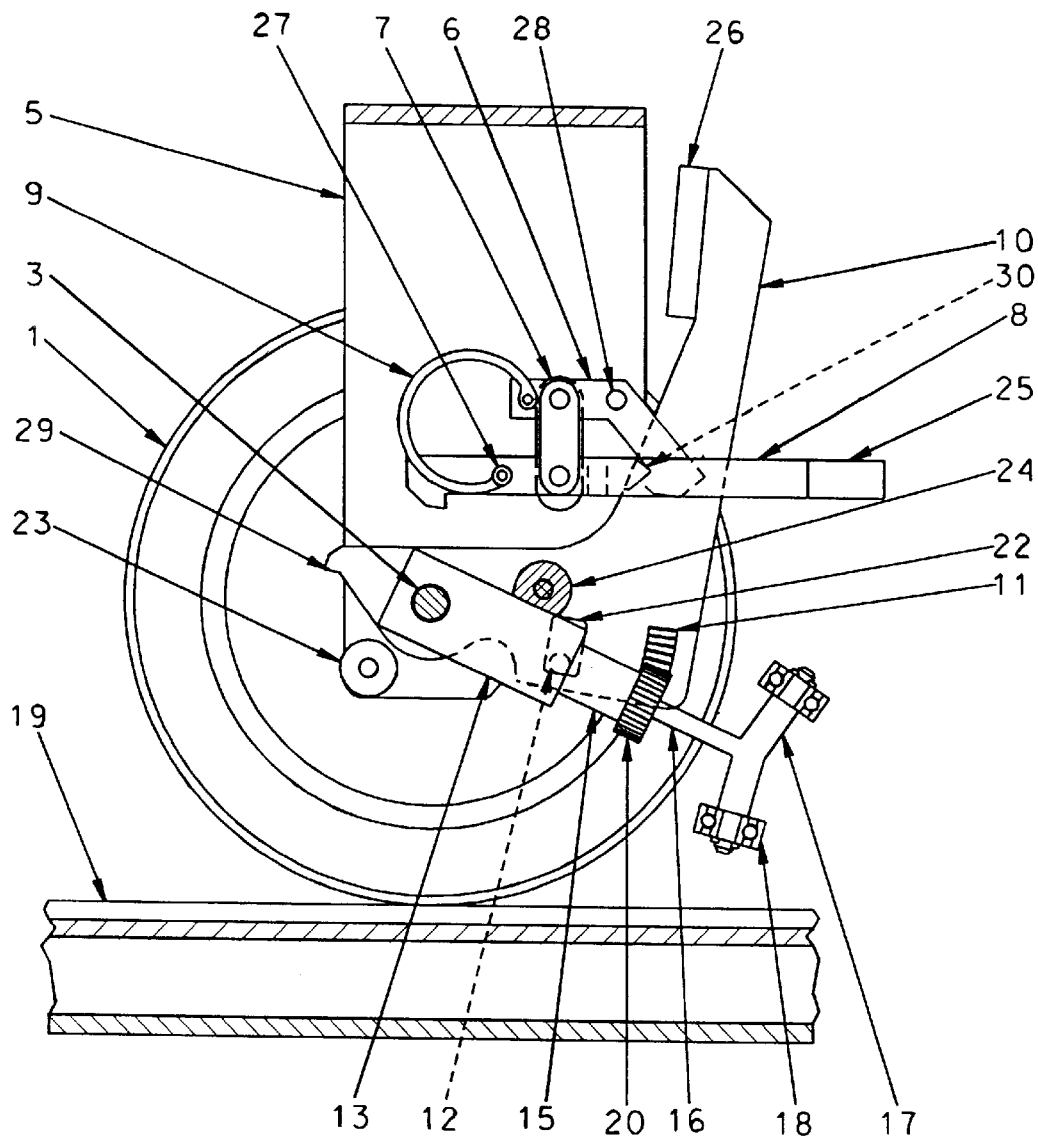
FIG. 9 is a cut away view showing swing plate unlocked to rotate clockwise and begin an engagement sequence.
Figure 10:
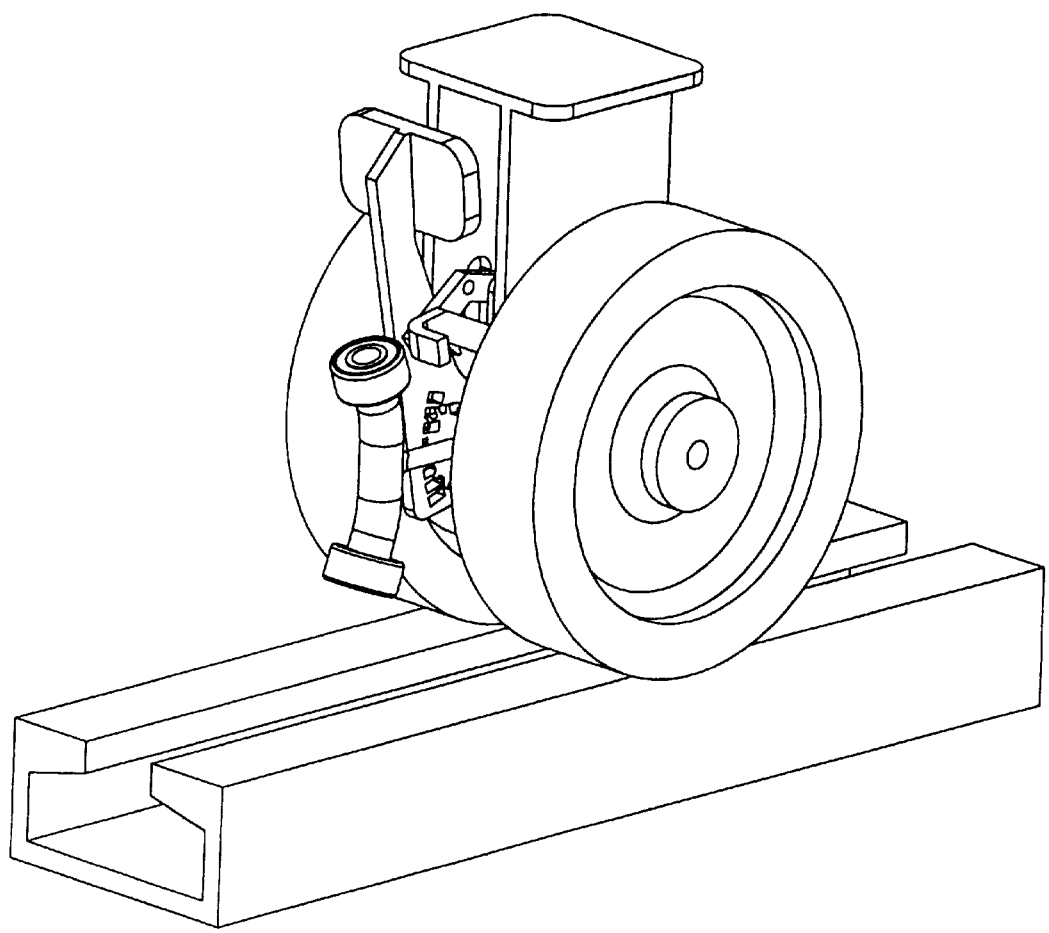
FIG. 10 is a pictorial view of the device showing the wheel or castor detached from the track.
Figure 11:
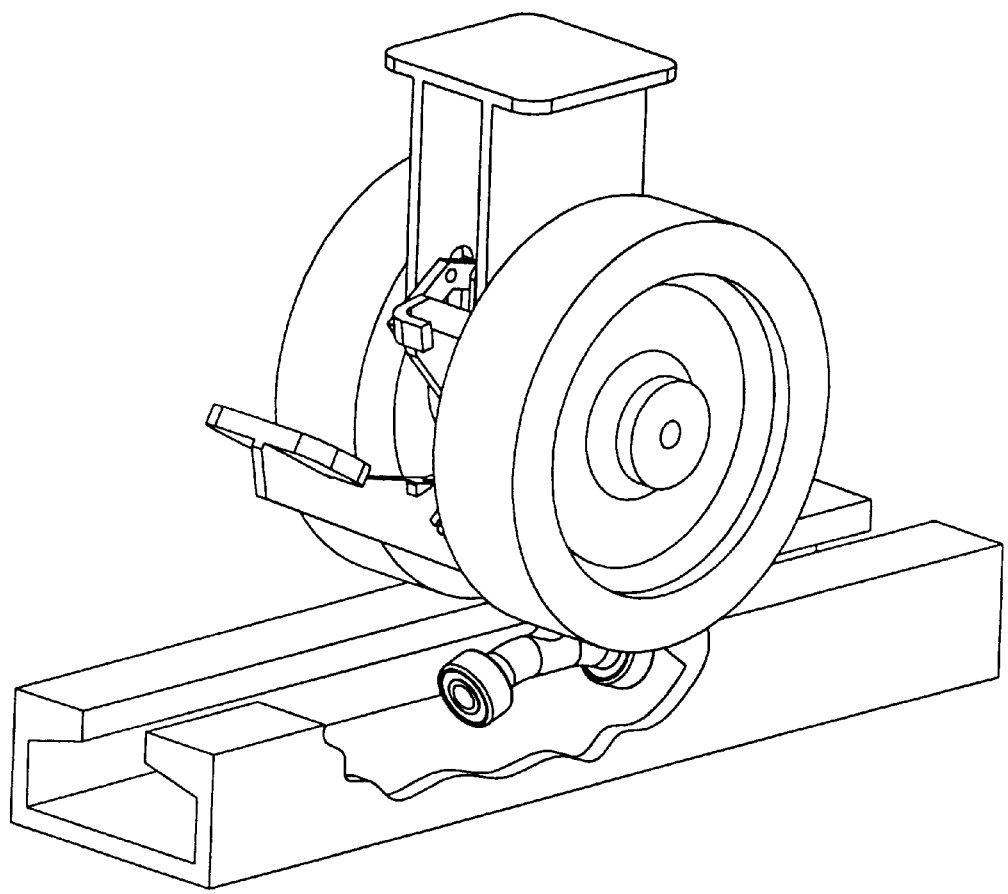
FIG. 11 is a pictorial view of the wheel or castor showing a locking shoe thereof in an intermediate position with respect to the track.
Figure 12:
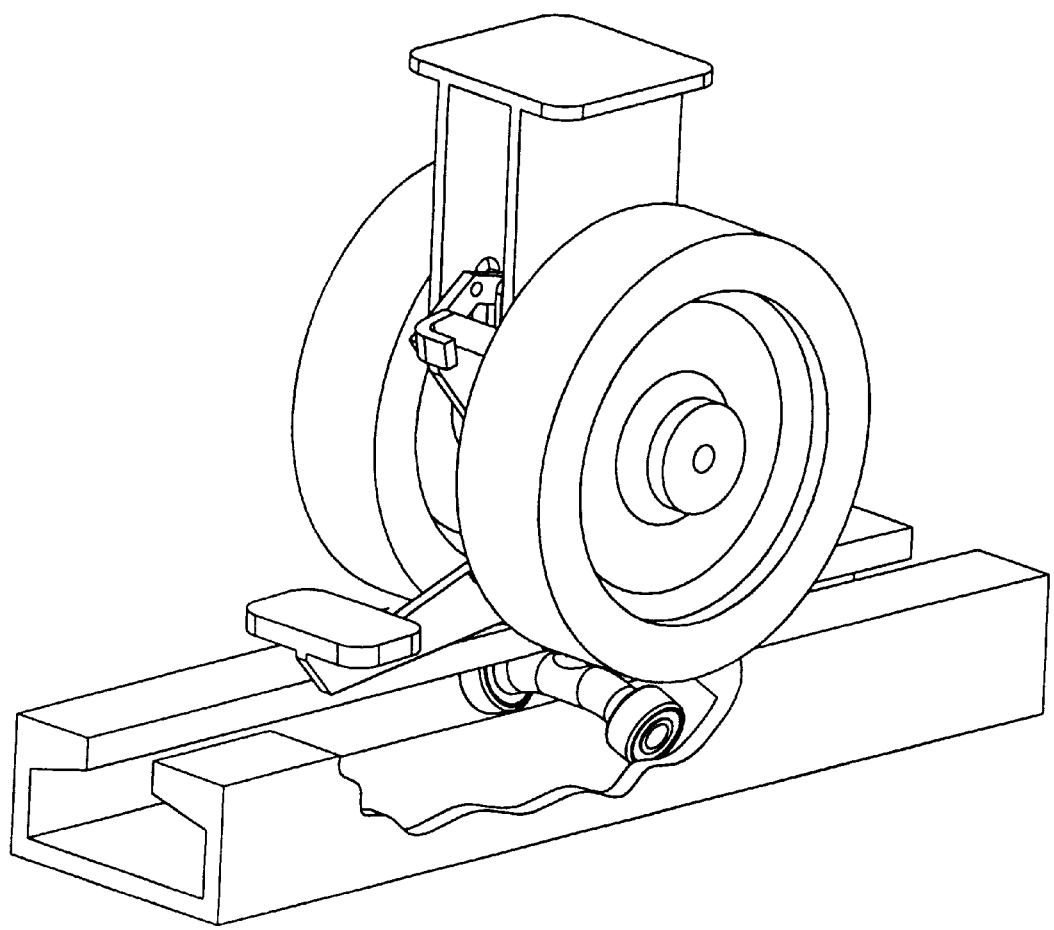
FIG. 12 is a pictorial view of the wheel or castor showing the locking shoe thereof locked into the track, with a portion of the track shown partially cut away.

For enabling engagement of the wheels or caster 1 to the track 19 from a stowed position as shown in FIG. 8, a lock tab 25 is depressed so that the swing plate 10 is released from the upper lock tab 6 and freed to rotate clockwise and downward from an initial stowed position. As the swing plate 10 rotates clockwise the contact pressure between the stem pinion 20 and the swing plate rack 11 and the friction between the cylinder 13 and the swing plate 10, assisted by the compression in the conical axle spring 31, is substantial enough to prevent relative rotation between the cylinder 13 and the swing plate 10. As the shoe 17 enters the track opening 19 (FIG. 7), the cylinder pin 12 contacts the progressive side of the swing plate slot 22, urging cylinder 13 to a vertical position. The cylinder 13 is rotationally halted at bottom dead center position (FIG. 6) by a flexible lower bumper stop 23 on a right axle support 5. Subsequent pressure on the swing plate foot tab 26 causes the swing plate 10 to rotate further about the axle 3, overcoming the friction between the cylinder 13 and swing plate 10. Since the chamber 13 is positively stopped at bottom dead center, the relative rotation facilitated by the slot 22 in the swing plate 10 causes the rack 11 on the swing plate 10 to turn the stem pinion 20 90 degrees, thereby aligning the shoe 17 in the retention position within the track 19 (FIG. 5). Pull is accomplished on the stem 16 by the compression of the cylinder spring 14 as shoe 17 is rotated, forcing the wheels or caster 1 and stem rollers 18 to bear on opposite sides of the slanted flange of the track 19. The swing plate 10 is stopped at its most advanced extent by the contact of the cylinder pin 12 against the regressive side of the swing plate slot 22. The swing plate 10 is locked in this position by the lower lock lever 8 latching the primary swing plate catch 29 on swing plate 10.

For enabling disengagement of the wheels or caster 1 from the track 19, lock tab 25 is depressed so as to disengage catch 29 from the lower lock lever 8, allowing swing plate 10 to rotate counterclockwise. Pressure from a toe or hand of an operator on the underside of the swing plate tab 26 causes the swing plate rack 11 to turn the stem pinion 20 90 degrees (FIG. 6), after which the swing plate slot 22 allows relative rotation between the swing plate 10 and the cylinder 13. Continued upward toe pressure causes the shoe 17 to egress the track opening 19 until the upper lock lever 6 catches the secondary swing plate catch 30 on swing plate 10 and locks swing plate 10 in the stowed or disengaged position, as shown in FIG. 8. An upper, flexible bumper stop 24 attached to a left axle support 4 prevents the cylinder 13 from further counterclockwise rotation.

The locking mechanisms of the described embodiment of the invention will now be described. To disengage the wheels or castor from the track, the lock tab 25 is depressed by foot, hand or other mechanical means (FIG. 5), rotating the lower lock lever 8 clockwise about the lower lever pivot pin 27 and causing the opposite hook end of the lower lock lever 8 to raise past the primary swing plate catch 29. Decompression of the flexible lower bumper stop 23 provides an immediate rotating impulse to the cylinder, rotating the cylinder upward to prevent unintended re-engagement of the lower lever hook. This enables the swing plate 10 to rotate counterclockwise, initializing the disengagement procedure described previously. To engage the track, the lock tab 25 (FIG. 8) is depressed by foot, hand or other mechanical means, whereby the lower lock lever 8 rotates clockwise about pin 27 (FIG. 9) causing the lock link 7 to move toward the upper lock lever 6, which causes counterclockwise rotation of the upper lock lever 6 about the upper lever pivot pin 28. This rotation causes the hooked end of the upper lock lever 6 to raise past the secondary swing plate catch 30. Decompression of the flexible upper bumper stop 24 provides an immediate downward rotating impulse to the cylinder 13, preventing unintended re-engagement of the upper lever hook. This enables the swing plate 10 to rotate clockwise, initializing the engagement procedure described previously. A C-shaped spring 9 provides the restoring force to the lock linkage neutral position.

The lock lever assembly may be replaced by a mechanical actuator 32 (FIG. 4) attached to a swing plate 10a via a spherical joint. The actuator 32 may be a linkage or a robotic ball screw, hydraulic or pneumatic piston which performs the same function as would a foot or hand depressing the swing plate tab. This would enable the device to be actuated in a robotic or remote environment.

Having thus described my invention and the manner of its use, it should be apparent that incidental changes may be made thereto that fairly fall within the scope of the following appended claims, wherein I claim:

1. A wheel assembly disposed for movement in a plane generally parallel to a surface and removably locked to said surface so as to prevent movement of said wheel assembly in directions other than said plane, said wheel assembly comprising:
   a support member,
   an axle extending through said support member,
   at least one wheel supported by said axle,
   an elongated locking member having a longitudinal axis and rotatably supported by said wheel assembly, said locking member movable between a lock position and a stowed position,
   an elongated first flange associated with said surface so that said flange is generally parallel to said surface so that in said lock position said locking member engages said flange and in a stowed position said locking member is disengaged from said flange and moved to said stowed position,
   whereby said wheel assembly is movable along said surface and said flange when said locking member is in said lock position and removable from said flange at any point along said flange by unlocking said locking member from said flange.

2. A wheel assembly as set forth in claim 1 wherein said locking member engages a side of said flange opposed from said surface.

3. A wheel assembly as set forth in claim 1 wherein said locking member is pivotally supported by said axle in a plane of rotation parallel to a plane of rotation of said wheel.

4. A wheel assembly as set forth in claim 1 wherein said locking member extends generally perpendicular to said axle, and is rotatable about said longitudinal axis between said lock position and said unlocked position.

5. A wheel assembly set forth in claim 4 wherein said elongated flange is part of a track further comprising an elongated second flange opposed from said first flange with a slot therebetween, and a hollow region below said first and second flanges, for allowing said locking member to move along a side of said first and second flanges opposite said wheel.

6. A wheel assembly as set forth in claim 5 wherein said locking member is provided with a generally T-shaped member at an end opposite said axle so that in said stowed position, said locking member is pivotable downward through said slot, whereupon said T-shaped member is rotatable about said longitudinal axis to lock said locking member in said lock position, whereby ends of said T-shaped member are underneath said first flange and said second flange, respectively, preventing movement of said wheel in any direction except along said track.

7. A wheel assembly as set forth in claim 6 wherein said locking member is biased toward said axle, causing said ends of said T-shaped member to bear against respective surfaces of said first flange and said second flange when said locking member is locked in said lock position.

8. A wheel assembly as set forth in claim 1 further comprising a lock actuator pivotally supported by said wheel assembly and engaging said locking member so that said locking member is moved between said stowed position and said lock position by operating said lock actuator.

9. A wheel assembly as set forth in claim 8 wherein said lock actuator and said locking member are coupled such that when said locking member is in said locked position, movement of said lock actuator either locks or unlocks said locking member to or from said first flange and said second flange by rotating said locking member about said longitudinal axis.

10. A wheel assembly as set forth in claim 9 further comprising a rack and pinion coupled to said locking member and said lock actuator, for rotating said locking member between said locked position and said unlocked position.

11. A wheel assembly as set forth in claim 10 further comprising a first catch and a second catch on said lock actuator, said first catch engagable with a first hook on said wheel assembly for locking said lock actuator and said locking member in said stowed position and said second catch engagable with a second hook on said wheel assembly for locking said lock actuator and said locking member in said lock position wherein said ends of said T-shaped member are locked under said first flange and said second flange, respectively.

12. A wheel assembly engagable to a track so that said wheel assembly is constrained for movement along said track, and engagable to and disengagable from said track at any point therealong by simply disengaging and moving a lever arm, said track comprising:
   a first flange and a second flange in spaced apart, opposed relation with respect to each other, with a hollow region below said first flange and said second flange, said wheel assembly comprising:
   a frame member supporting an axle,
   at least one wheel supported by said axle,
   a locking member having a longitudinal axis and supported by said axle for removably locking said wheel assembly to said track so that said wheel assembly is movable only along said track, said lever arm also supported by said axle and cooperating with said locking member to lock and disengage said locking member to and from said track, respectively,
   a locking lever supported in pivotal relation by said frame member, and provided with a first catch for engaging said lever arm to maintain said locking member in a locked position within said track, said locking lever being engagable with a second catch to lock said locking member in a disengaged position from said track.

13. A wheel assembly as set forth in claim 12 wherein said locking member rotates about said longitudinal axis to lock and unlock said locking member into and from said track.

14. A wheel assembly as set forth in claim 13 further comprising a rack and pinion arrangement between said locking member and said lever arm, for rotating said locking member about said longitudinal axis.

15. A wheel assembly as set forth in claim 13 wherein said locking member further comprises:
   a hollow cylinder supported at one end by said axle,
   a rod longitudinally positioned in said cylinder and extending through an opposite end of said cylinder, said rod having a first end in said cylinder and provided with an enlarged region, and said rod being rotatable about said longitudinal axis, a spring positioned in said cylinder between said opposite end of said cylinder and said enlarged region so as to bias said rod toward said axle, a generally T-shaped member at a second end of said rod, said T-shaped member positionable in said track so that when said rod is rotated about said longitudinal axis so that said T-shaped member is perpendicular to said first flange and said second flange, said T-shaped member is biased by said spring against inner surfaces of said first flange and said second flange.

16. A wheel assembly as set forth in claim 15 further comprising an antifriction roller on each end of said T-shaped member.

17. A wheel assembly as set forth in claim 15 wherein said inner surfaces of said first flange and said second flange are each inclined transversly with respect to said first flange and said second flange.

* * * * *